US011362910B2

(12) United States Patent
Lin et al.

(10) Patent No.: US 11,362,910 B2
(45) Date of Patent: Jun. 14, 2022

(54) DISTRIBUTED MACHINE LEARNING FOR ANOMALY DETECTION

(71) Applicant: International Business Machines Corporation, Armonk, NY (US)

(72) Inventors: Jian Lin, Apharetta, GA (US); Matthew Elsner, Dunwoody, GA (US); Ronald Williams, Austin, TX (US); Michael Josiah Bolding, Smyrna, GA (US); Yun Pan, Roswell, GA (US); Paul Sherwood Taylor, Redwood City, CA (US); Cheng-Ta Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 16/037,857

(22) Filed: Jul. 17, 2018

(65) Prior Publication Data
US 2020/0028862 A1  Jan. 23, 2020

(51) Int. Cl.
| H04L 41/28 | (2022.01) |
| H04L 9/40 | (2022.01) |
| G06F 17/15 | (2006.01) |
| H04L 41/16 | (2022.01) |
| G06N 20/00 | (2019.01) |
| H04L 43/04 | (2022.01) |

(52) U.S. Cl.
CPC ............ *H04L 41/28* (2013.01); *G06F 17/15* (2013.01); *G06N 20/00* (2019.01); *H04L 41/16* (2013.01); *H04L 63/104* (2013.01); *H04L 63/1425* (2013.01); *H04L 63/20* (2013.01); *H04L 43/04* (2013.01); *H04L 63/1433* (2013.01)

(58) Field of Classification Search
CPC . H04L 63/104; H04L 63/1416; H04L 63/102; H04L 63/20; H04L 63/1441; H04L 63/1433; H04L 43/04; H04L 63/1425; H04L 67/10; H04L 41/28; H04W 12/086
See application file for complete search history.

(56) References Cited

U.S. PATENT DOCUMENTS

2015/0269050 A1    9/2015  Filimonov et al.
2018/0375886 A1*  12/2018  Kirti ................ H04L 63/104

OTHER PUBLICATIONS

IBM Security Solution Brief, "Beat insider threats with integrated user behavior analytics," Feb. 2018.
IBM Security Data Sheet, "IBM QRadar User Behavior Analytics (UBA)," Aug. 2017.

* cited by examiner

*Primary Examiner* — Kyung H Shin
(74) *Attorney, Agent, or Firm* — Jeffrey S. LaBaw; David H. Judson (57) ABSTRACT

A tiered machine learning-based infrastructure comprises a first machine learning (ML) tier configured to execute within an enterprise network environment and that learns statistics for a set of use cases locally, and to alert deviations from the learned distributions. Use cases typically are independent from one another. A second machine learning tier executes external to the enterprise network environment and provides further learning support, e.g., by determining a correlation among multiple independent use cases that are running locally in the first tier. Preferably, the second tier executes in a cloud compute environment for scalability and performance.

20 Claims, 7 Drawing Sheets

DISTRIBUTED MACHINE LEARNING FOR ANOMALY DETECTION

BACKGROUND

Technical Field

This disclosure relates generally to techniques to detect anomalous or malicious network activities or user behavior, e.g., in an enterprise network.

Background of the Related Art

Enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills. In particular, the ever increasing number of threats at scale requires automation in support of security analysts, who are responsible for preventing, detecting and responding to these threats. In most cases, the analyst must manually search through a wide range of data sources (some private, many public), review past threat events and how they were handled, check for duplicate events, currently open similar events and a knowledge database, etc., to determine an appropriate response procedure to handle this information. This process of data collection, analysis, and determining the final disposition of the alert, is time consuming and tedious for an analyst.

There are a variety of tools that exist for threat monitoring to analyze a wide range of data sources to identify patterns that are indicative of threats, security policy and control anomalies. When these threats and/or anomalies are detected, actionable alerts are created. One such tool is IBM® QRadar® User Behavior Analytics (UBA). A UBA system of this type leverage advances in machine learning (ML), and it adds user context to network, log, vulnerability and threat data to more quickly and accurately detect attacks. Using this tool, security analysts can easily see risky users, view their anomalous activities and drill down into the underlying log and flow data that contributed to a user's risk score.

An anomaly detection system can provide many use cases to detect anomalies from different perspectives, even where each use case works independently. These use cases include, for example, user volume activity anomaly, abnormal outbound transfer attempts, abnormal amount of risky IP addresses accessed, user behavior deviation from groups, and others. Although UBA systems work well for their intended purpose, there are several problems that sometimes arise when they are used. One problem is that, as new use cases are continuously added, system performance becomes a bottleneck, typically due to the system's inability to scale. Another problem is that each use case has an independent outcome; thus, once again as the number of use cases increases, it becomes more difficult for security analysts to consume and correlate the generated results.

Thus, there remains to address these performance issues, and to provide for enhanced anomaly detection in these types of operating environments.

BRIEF SUMMARY

To that end, this disclosure provides for a "tiered" (or "distributed") machine learning-based infrastructure or framework that is used to detect abnormalities in network activities or other user behavior patterns in an enterprise. In general, the distributed nature of the approach is realized by providing a first (or "local") machine learning (ML) tier that is configured to execute within an enterprise network environment itself and that provides machine learning to learn statistics for a set of use cases locally, and to alert deviations (e.g., to security analysts) from the learned distributions. One or more of the use cases are independent from one another. In a typical implementation, the first tier executes as an installed application in a Security Information and Event Management (SIEM) platform. In addition, the framework further includes a second (or "central" or "global") ML tier external to the enterprise network environment and that provides further ML support, e.g., by determining a correlation among multiple independent use cases that are running locally in the first tier. Preferably, the second tier executes in a cloud compute environment for scalability and performance, as correlating statistics from independent use cases is very computationally-intensive and not feasible in the local environment itself. By distributing the machine learning in this manner, an enhanced anomaly detection framework is provided that addresses the performance and other operational limitations associated with the current state-of-the-art.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
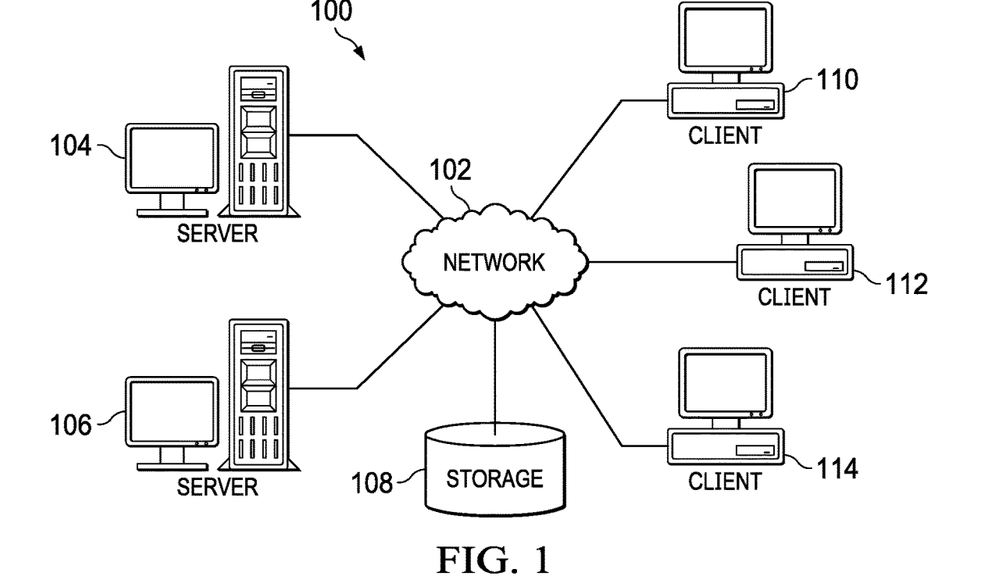
FIG. 1 depicts an exemplary block diagram of a distributed data processing environment in which exemplary aspects of the illustrative embodiments may be implemented.
Figure 2:
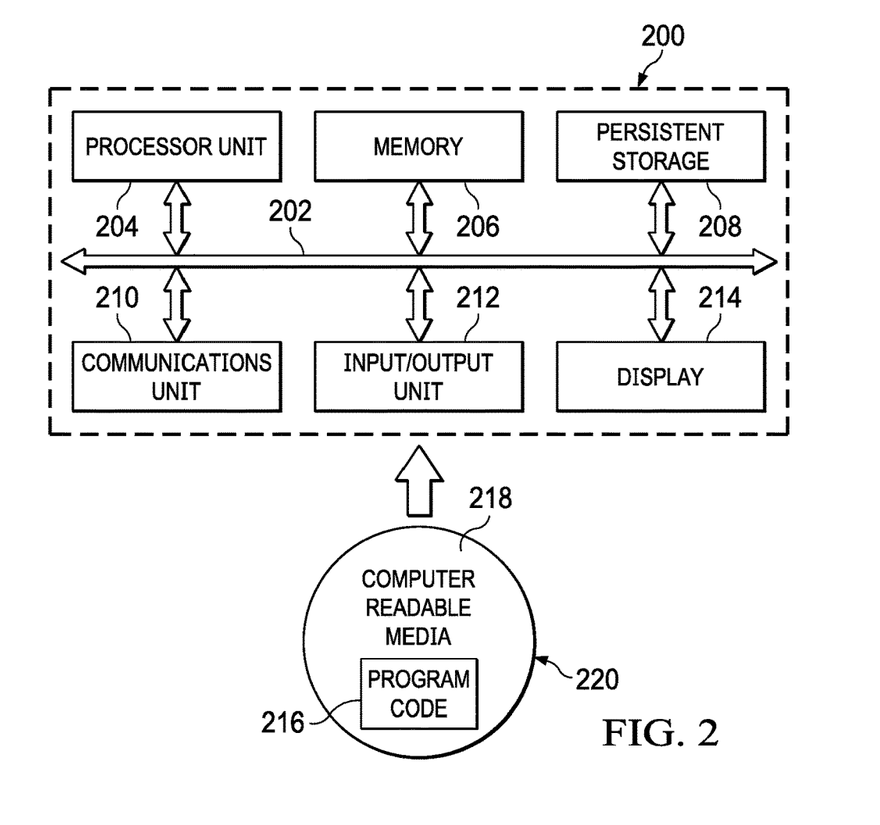
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
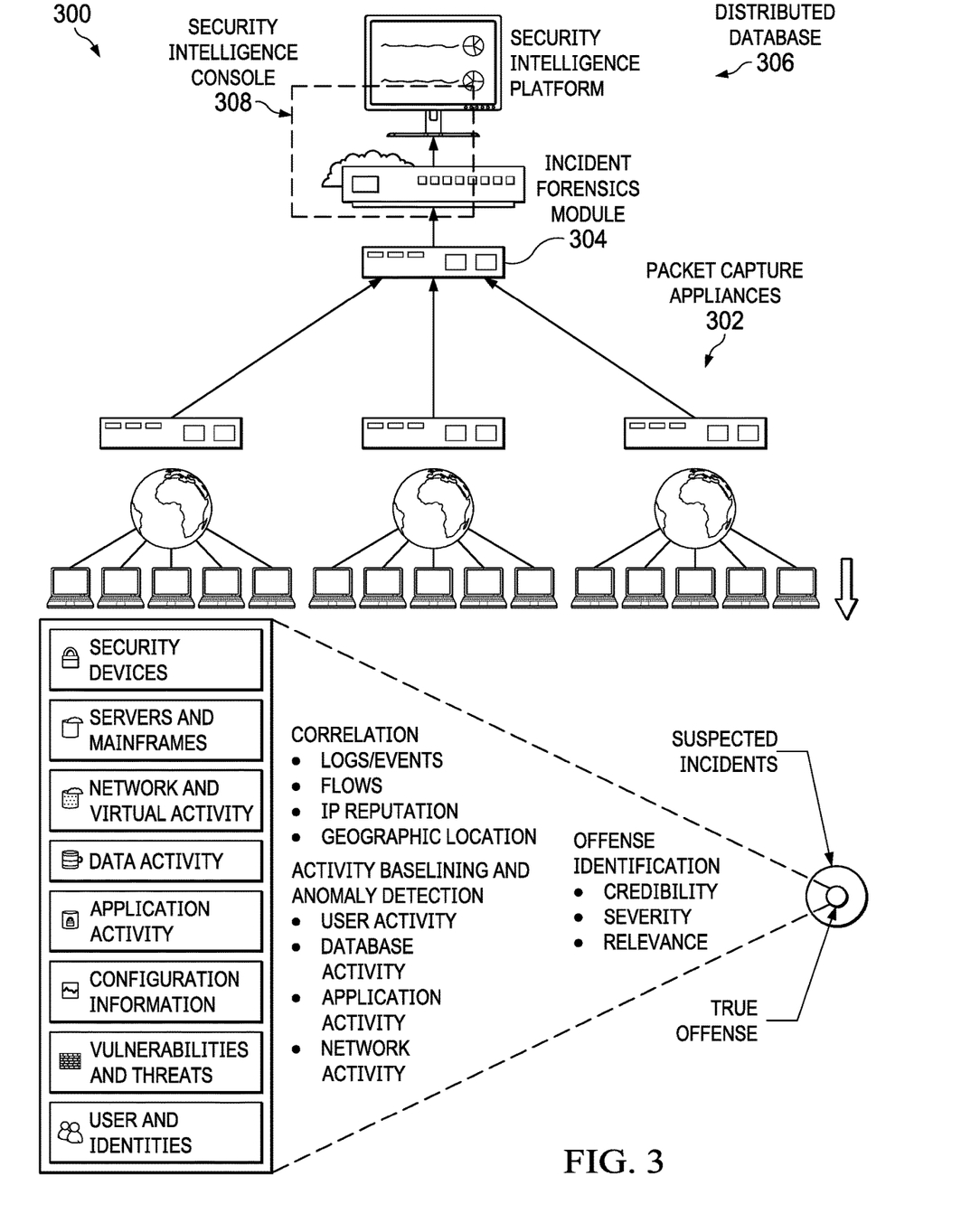
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Figure 4:
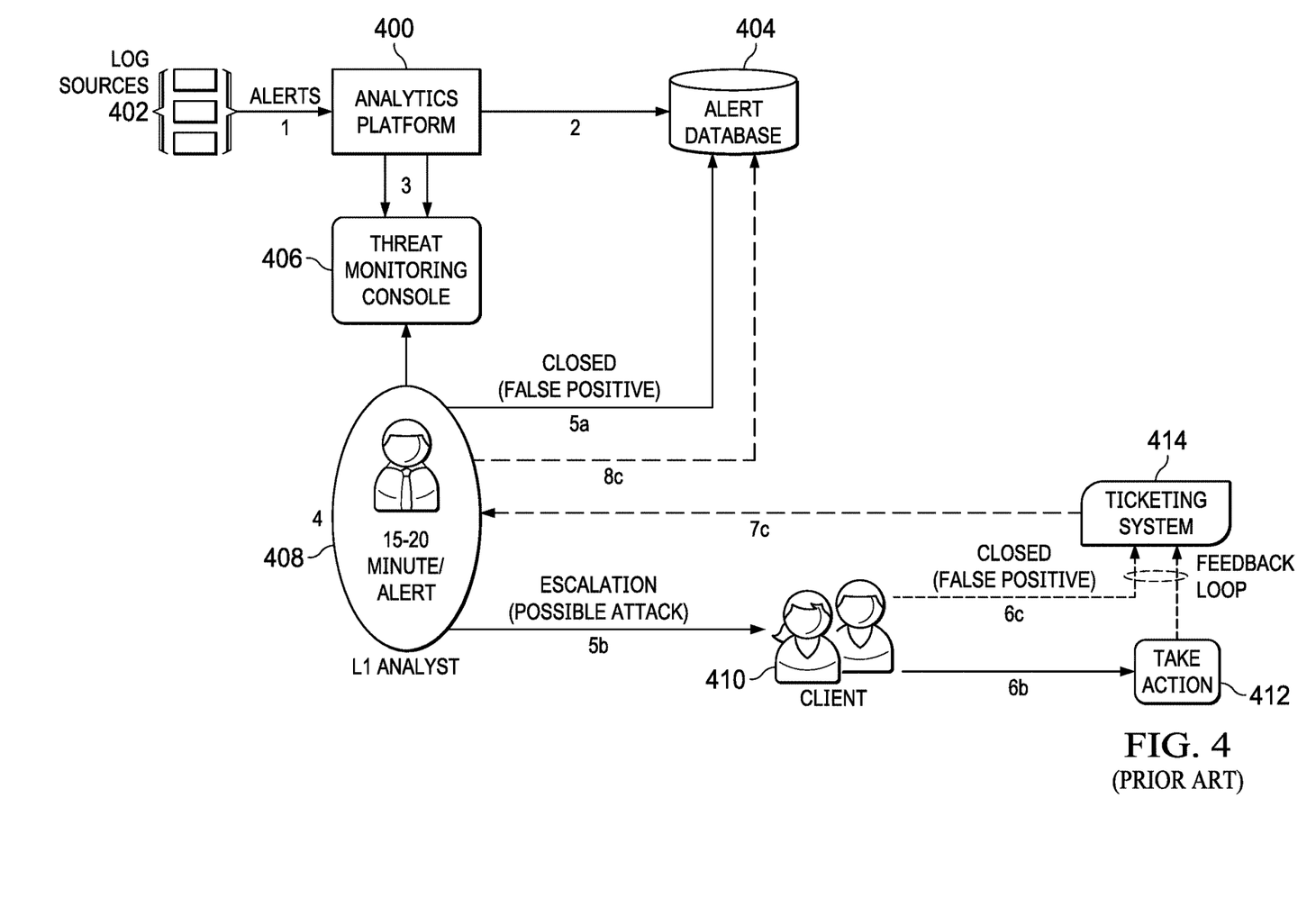
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

By way of additional background, the enterprise typically includes an identity management system by which the Company can define and manage organizational role and access entitlement to resources. Role assignment includes assigning a user to one or more business roles in the organization. Organizational roles are used to group people according to their function in the organization. Thus, for example, all Company employees are granted the employee role in the organization. Typically, a user may be assigned to one or more organizational roles in a Company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

The enterprise typically includes a directory service that hosts each directory in the organization. Each such directory typically stores information about a particular application and the user(s) or group(s) of users that have entitlements to use that application, or an application instance. A representative directory is accessible via the Lightweight Directory Access Protocol (LDAP), which is a directory service protocol that runs on top of the TCP/IP stack. LDAP provides a client-server based mechanism that can be used to connect to, search, and modify network-accessible directories. Using LDAP, a directory client can query the directory application and obtain user/group data.

Cloud Computing Model

As described above, the distributed machine learning techniques of this disclosure preferably leverage computing elements that are located in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In a typical cloud computing environment, a set of functional abstraction layers are provided. These include a hardware and software layer, a virtualization layer, a management layer, and a workload layer.

The hardware and software layer includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

The workloads layer provides the functionality for which the cloud computing environment is utilized.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
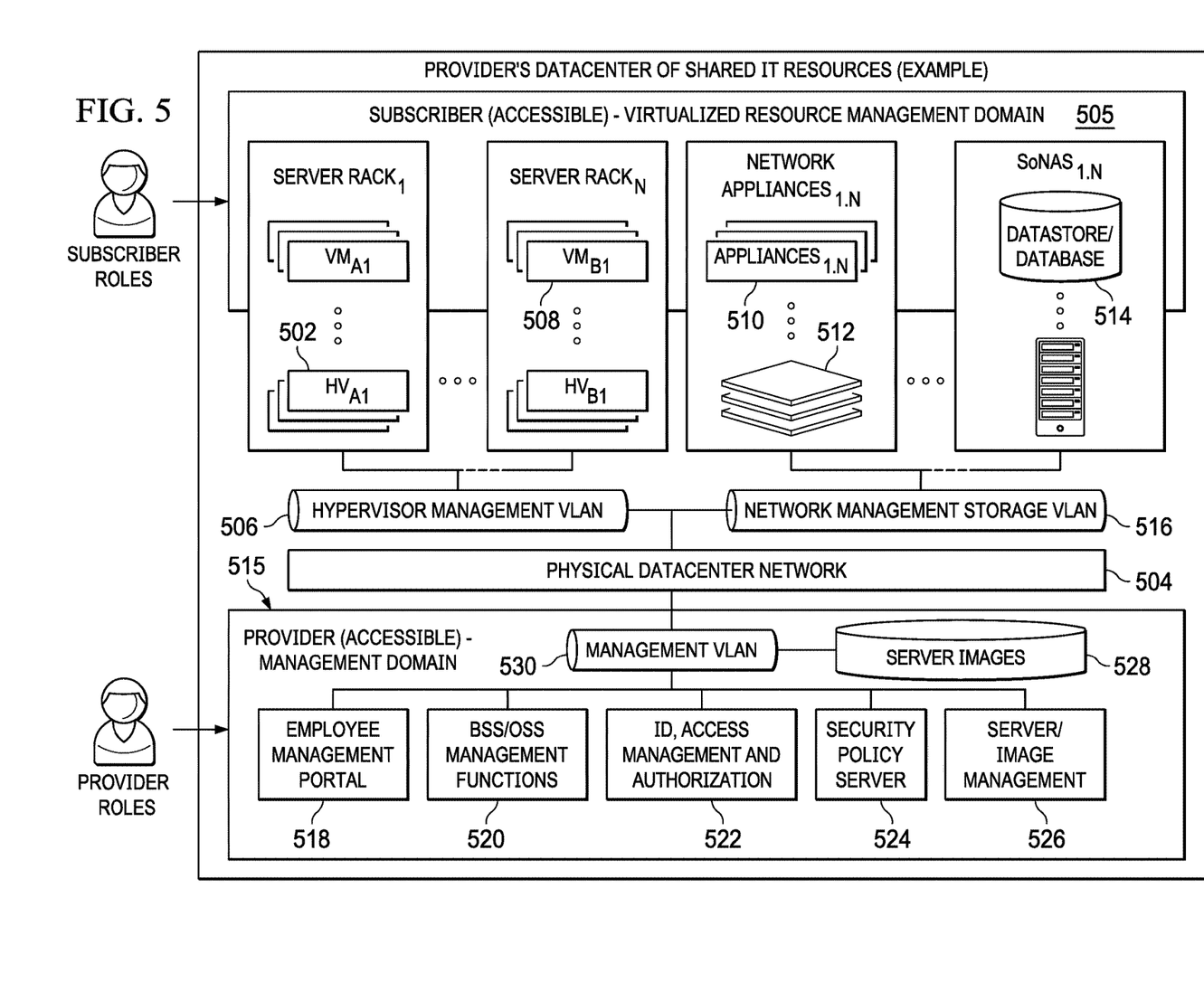
FIG. 5 depicts a data center that includes a cloud compute infrastructure that may be leverage by the distributed ML framework of this disclosure.

FIG. 5 illustrates a typical IT infrastructure that supports virtualization of resources and in which the database server (s) are typically housed. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 418, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Two-Tier Machine Learning System for Anomaly Detection

With the above as background, the following describes the subject matter of this disclosure.

Figure 6:
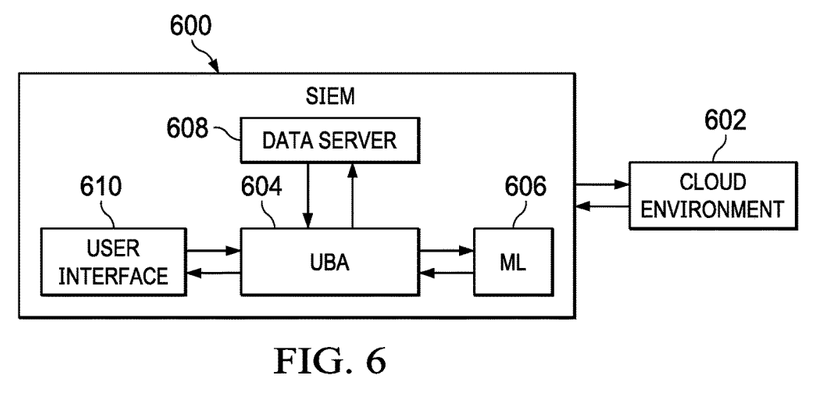
FIG. 6 depicts the basic distributed ML framework of this disclosure comprising a first tier (e.g., a Security Information Event Management (SIEM) platform that includes a User Behavior Analytics (UBA) function), and a cloud-supported second tier.

As described above, the approach herein is to provide a "tiered" (or "distributed") machine learning-based approach that is used to detect abnormalities in network activities or other user behavior patterns in an enterprise. As also described, the distributed nature of the approach is realized by providing "first" and "second" machine learning-based tiers that cooperate to provide an integrated, distributed ML framework. As will be described, and in the typical implementation, the first tier executes within a local operating environment associated with the enterprise network, such as behind (within) an enterprise firewall. The exact position or location of the first tier is not a requirement, although typically it will be located as an installed application of a SIEM (or other such enterprise-based security platform functionality). This first tier is configured to provide machine learning to learn statistics for a set of use cases locally, and to alert deviations (e.g., to security analysts) from the learned distributions (ML models). As will be described, typically one or more of the use cases are independent from one another and, in a preferred embodiment, all or substantially all of the use cases are independent from one another. FIG. 6 depicts the basic distributed ML framework of this disclosure comprising the first local tier, and the second central tier. The second tier is sometimes referred to herein as a "global" tier, although the notion of being "global" does not necessarily carry a geographical connotation.

Referring to FIG. 6, the first tier executes as a UBA system, e.g., within a Security Information Event Management (SIEM) platform. As depicted the SIEM 600 supports the UBA 604 as an installed application. As will be described, UBA 604 leverages machine learning 606 to learn statistics for a set of use cases running locally, e.g., using data supplied from the data server 608, with anomaly reporting via a user interface 610. In particular, the data server 608 provides network, log, vulnerability and threat data, and that data is analyzed by UBA 604 (leveraging ML 606) to more quickly and accurately detect attacks. Using this tool, and as described above (with respect to the description associated with FIGS. 3-4), security analysts can easily see risky users, view their anomalous activities and drill down into the underlying log and flow data that contributed to a user's risk score. As also depicted, the first tier executing in the SIEM 600 operates in association with the second tier executing in the cloud computing environment 602. In a representative use case, the second tier is implemented in or across one or more cloud data centers, such as depicted in FIG. 5. The second tier may be dedicated to the first tier, or in an alternative embodiment the second tier may operate as a shared execution environment (as described further below) that provides support for a plurality of first tiers. A service provider may operate the second tier "as-a-service" and thus provide second tier-based ML (also as will be described) for multiple (potentially) distinct first tier environments. In yet another alternative embodiment, the machine learning in whole or in part may even be implemented across more than just two tiers; thus, e.g., there may be multiple tiers of distributed machine learning, with the output of a tier (or level) potentially seeding a next succeeding tier, and so on.

Returning back to FIG. 6, and in the usual case, the second (or "central") ML tier thus executes external to the enterprise network environment in which the first tier executes, and the second tier provides further ML support for the ML being carried out in the first tier. In this manner, the second tier can be said to "extend" the ML functionality being performed by or within the first tier. A representative extension of this type is the second tier determining a "correlation" between or among multiple independent use cases that are running locally (executing) in the first tier. This correlation provides further often more fine-grained anomaly detection that can then be reported back to the security analysts or otherwise actioned. As has been described, the second tier preferably executes in the cloud compute environment 602 for scalability and performance. This distributed ML architecture as depicted in FIG. 6 is highly advantageous, especially because correlating statistics from independent use cases is very computationally-intensive and not feasible in the local environment itself. By distributing the machine learning in this manner, an enhanced anomaly detection framework is provided that addresses the performance and other operational limitations associated with the current state-of-the-art.

Figure 7:
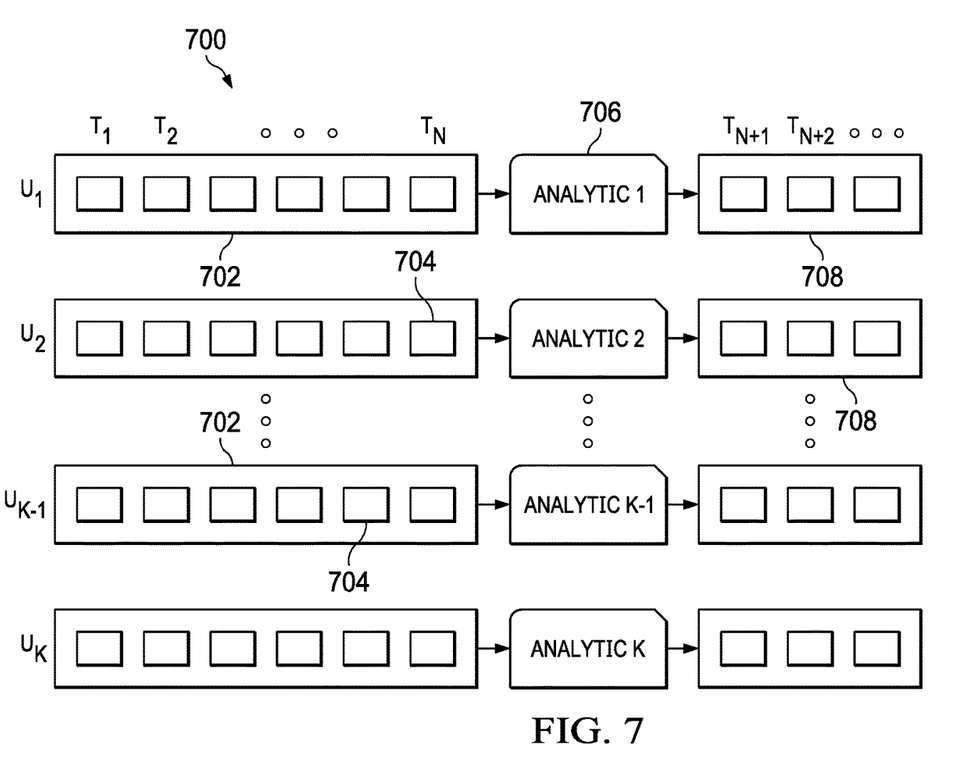
FIG. 7 depicts a representative UBA-type system executing in the first tier with respect to a set of independent use cases to thereby generate a set of ML models (learned distributions) against which anomalies are detected and alerted.

FIG. 7 depicts a representative UBA-type system 700 executing in the first tier with respect to a set of independent use cases to thereby generate a set of ML models (learned distributions) against which anomalies are detected and alerted, preferably by the local system. This local analytics system preferably comprises multiple use cases 702. For illustrative purposes, each use case 702 uses a different machine learning algorithm (analytic) 706, although this is not necessarily a requirement. In this example, the training data for each use case is time series data 704, such as activities characteristics for the users being monitored for each time interval. Typically, each analytic 706 runs independently, and their training data do not have to be the same. As the ML executes, a set of learned distributions 708 are generated. A learned distributed is also known as a ML model, and such models are then used in a known manner to detect anomalies, with deviations reported to security analysts or otherwise actioned. One specific example use case tracks a user's general activity by time and creates a model for the user's predicted weekly behavior patterns; then, if the user's activity deviates from the learned behavior, it is deemed suspicious and an event is generated to increase the user's risk score. Other use cases might involve models of outbound transfer attempts, IP address accesses, etc. While FIG. 7 depicts the first tier executing just time series-based analytics, this is not a limitation, as one or more analytics may be based on other than time series data. Thus, for example, one such alternative may model user group behavior and using that model to identify whether a given user's behavior (relative to the group model) represents a potential anomaly. Unless otherwise stated, the particular nature of the use cases executing in the local ML tier is not a limitation of this disclosure.

Figure 8:
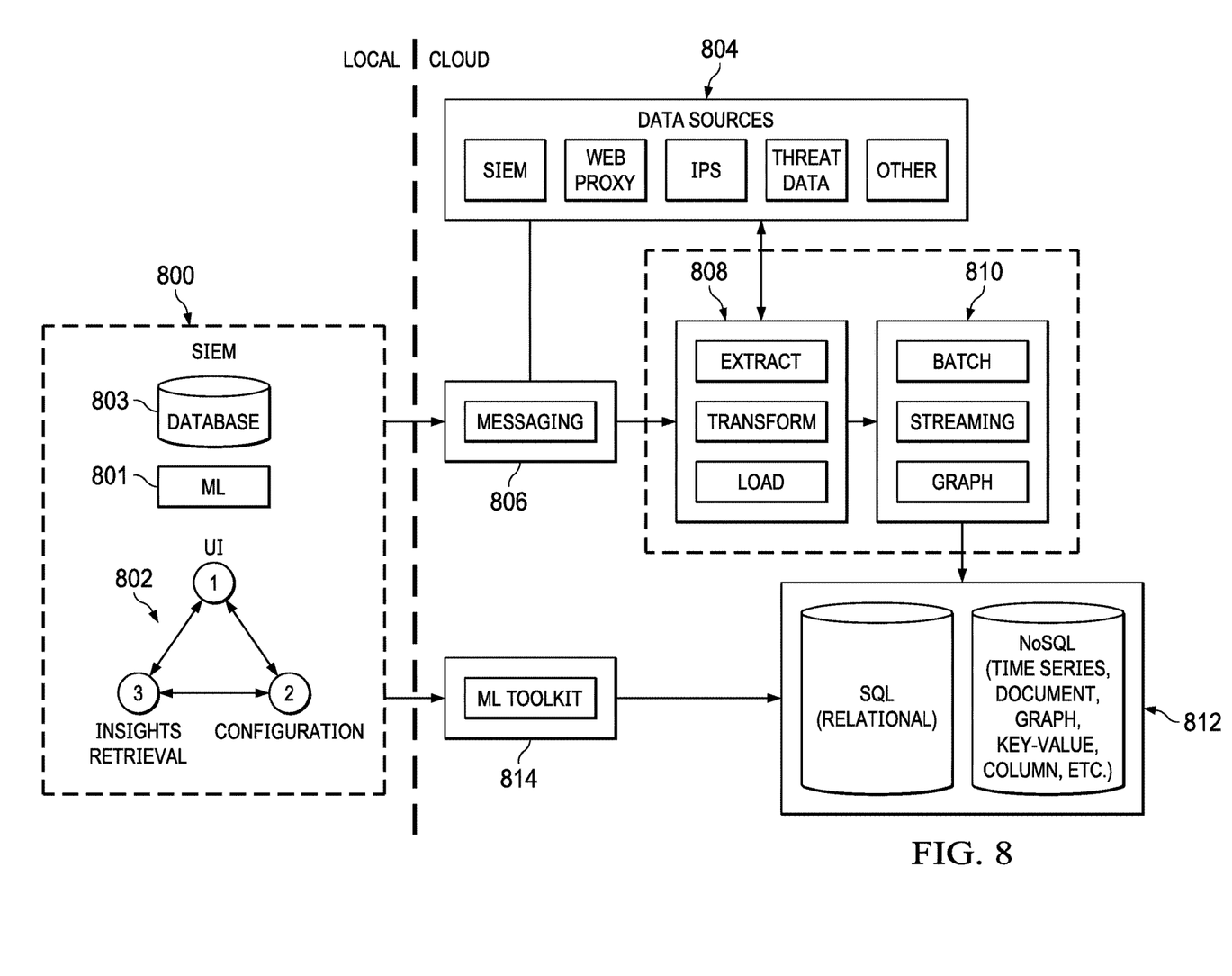
FIG. 8 depicts a representative set of computing functions and support elements in the second tier and that are used to perform additional machine learning on information streamed or otherwise provided from the first tier.

The model(s) generated by the SIEM-based UBA system typically have standalone value (as they can be used for local anomalous behavior detection and reporting); according to this disclosure, information generated in the first tier is also supplied to the second tier, as depicted in FIG. 8 and as is now described. In addition, training data supplied to the first tier typically is also supplied to the second tier, as are other data sources. Typically, information output from the first tier is streamed to the second tier in a continuous manner, although information from the first tier may also be supplied in batch, or in response to request-response protocol initiated from the cloud side. Communications between the tiers typically occurs over a secure transport medium (e.g., a private network), or by securing the information itself (e.g., via encryption) using known technologies such as SSL/TLS. The particular nature of the communication(s) between the local and cloud sides of the distributed ML framework is not a limitation.

The provision of information from the first tier to the second tier provides significant advantages. In particular, and as has been described, as use cases (such as 702 in FIG. 7) are continuously added to the system, the performance of the system becomes a bottleneck due to the system's inability to scale. Further, the independent outcomes (as generated by applying the models 708) of the increased number of use cases make it very difficult for security analysts to consume and correlate the results generated from these use cases. The second tier of the distributed ML system thus addresses these deficiencies.

FIG. 8 depicts a representative set of computing functions and support elements in the second tier and that are used to perform additional machine learning on information streamed or otherwise provided from the first tier. As will be described, in a typical operating scenario, these computing functions provide further (or extended) machine learning, such as estimating exponentially-weighted moving average and variance with respect to the independent use cases. The resulting models produced by the cloud-based analytics are then used to score new data points received from the local systems (or otherwise made available to the cloud-based portion of the framework). In one embodiment, and as described below the exponentially-weighted moving average and variance computed in the cloud is Mahalanobis distance (MD), which is a multi-dimensional measure of a distance between a point and a distribution (akin to measuring how many standard deviations away a point is from a distribution mean. While Mahalanobis distance is one preferred metric, it is not intended to be limiting, as other metrics that may be computed in the cloud include, without limitation, Pearson's chi-squared test, matching likelihood, and others.

As depicted in FIG. 8, first tier comprises SIEM 800 that uses the local ML 801 and data 803 to generate insights and configuration via the UBA system 802. This operation has been described above, e.g., in the context of the time series-based use cases in FIG. 7. The right side depicts the ML components in the cloud, and these include a set of data sources 804, a messaging system 806, data handling (ETL 808), data processing 810, and data storage 812. A representative implementation of these components is IBM® Security Cloud (ISC). The data sources 804 may vary and typically are associated with data souring components executing in or in association with the enterprise; thus, the data sources may comprise the SIEM, web proxies, IPS, threat intelligence systems (e.g., from IBM® X-Force Exchange), and others. Data sources may also comprise external data sources (e.g., threat information available from third party databases). The messaging system 806 (e.g., Apache Kafka) provides stream processing and is used to accept configurations and other data (e.g., from security analysts), and to schedule tasks for the components executing in the cloud. In one embodiment, the messaging system is configured as a messaging hub and operates in a publish/subscribe manner according to various topics that can be "seen" (subscribed to) by a given data source 804). Data ETL (Extract, Transform/ and Load functions) 808 receive data from the variety of data sources, and data processed through the ETL layer is then provided for further processing (namely, the ML analytic). As depicted, data processing 810 may be carried out in batch, via stream processing and/or using graph processing. The model and analytics results are then stored in the data storage layer 812, e.g., SQL and NoSQL databases. As also depicted, the cloud-based system may also include a ML toolkit 814 that interfaces to other ML systems). Thus, the toolkit may enable a user to perform customized prototyping to analyze the data.

Thus, in a preferred embodiment, the cloud tier is supplied with various types of information, such as: configurations, training data for the local tier, the outputs from the local tier, and potentially training data from other sources (see, e.g., FIG. 8, 804). In one embodiment (described below in the context of an MD computation), the cloud tier only needs to receive the outputs from the local tier, namely, the data points representing anomalies, but this is not a limitation.

Figure 9:
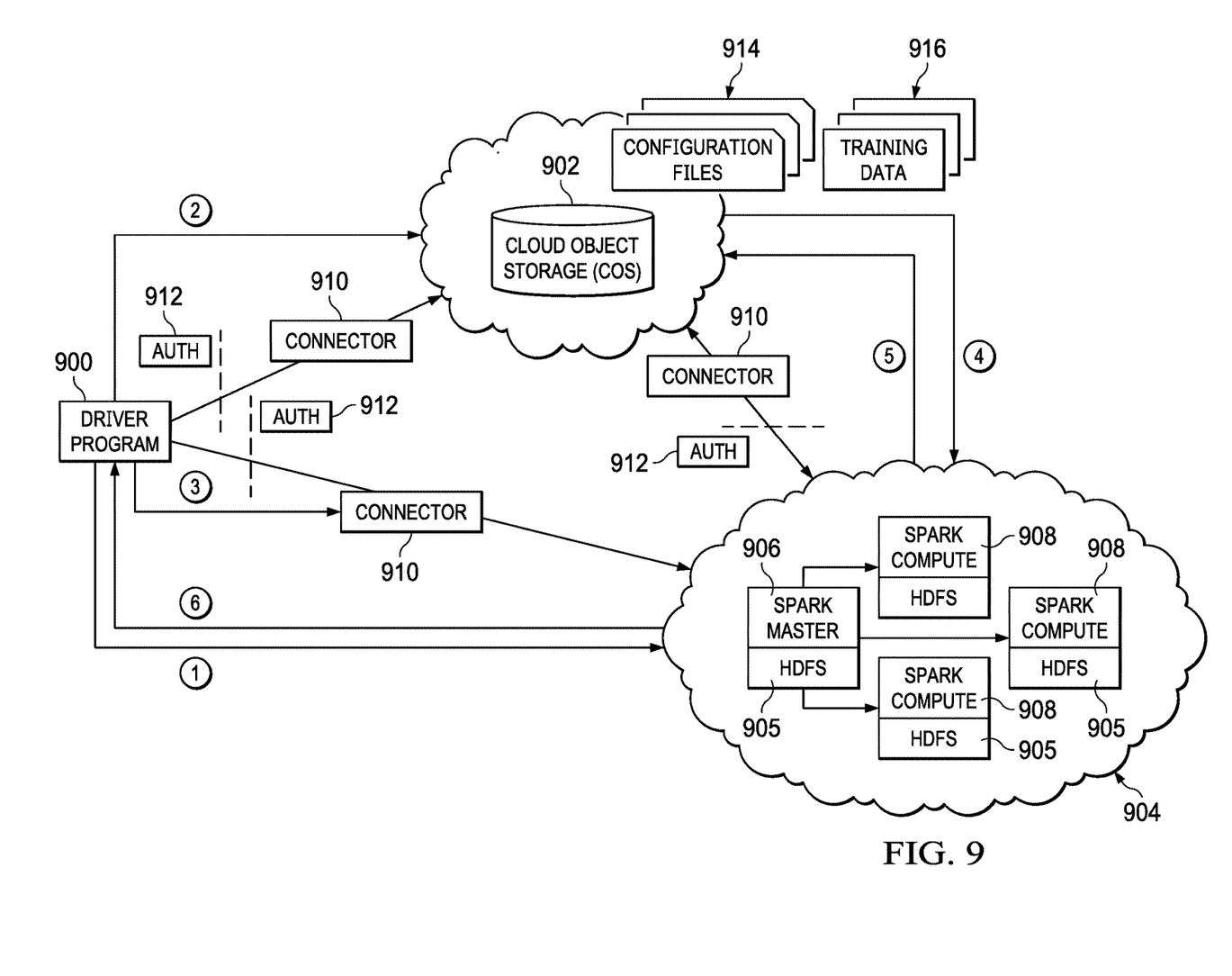
FIG. 9 depicts further details of a representative cloud computing infrastructure supporting the second ML tier in a representative embodiment.

FIG. 9 depicts further details of a representative cloud computing infrastructure supporting the second ML tier in a representative embodiment. As depicted, the cloud tier comprises several subsystems, namely: a driver program 900, a cloud object storage (COS) system 902, and a parallel computation platform 904 (such as an Apache Spark cluster). Communications among these subsystems are provided by connectors 910, which may be implemented as SDKs (e.g., Boto3, Aspera, Livy, and Stocator). Authentication among the subsystems is provided by an authentication service 912. In an exemplary operating scenario, the driver program 900 pushes configurations 914 and training data 916 to the cloud storage 902. The driver program 900 also deploys the ML functionality (e.g., in the form of an application package) onto a Hadoop Distributed File System (HDFS) 905 that is co-located with the Spark cluster comprising a master (leader) node 906, and a set of compute nodes 908. The ML application running on the Spark cluster retrieves the ML configurations and training data to the HDFS 905, and then it performs machine learning computation on the Spark cluster components in a known manner. A Spark cluster-based ML library (e.g., Gaussian Mixture Model and Latent Dirichlet allocation (LDA)) may be used for this purpose. Results are reported in the cloud, and/or returned to security analysts associated with the enterprise. The above-described cloud infrastructure components are merely representative.

Thus, in the context of this disclosure, a distributed machine learning environment is provided, preferably with a first part of the learning running in the local environment, while the second part of the learning runs on the cloud. In the first tier, preferably machine learning is used to learn statistics for multiple use cases, while the second tier preferably captures the correlation among the multiple use cases that run locally. The following description provides one example scenario of this tiered approach.

Local Detection (On the Local UBA Application):

Let denotes user's log activity up to time t (training data) used to analyze use case:

In the above, U is the total number of users, W represents a length of a sliding window, and K is a total number of use cases running in the local environment. An anomaly score $S_{j,t}^k$ of user j at time t for is measured by activity deviation from a mean of the training data for this user:

$$S_{j,t}^k = \frac{c_{j,t} - \overline{c_{j,t-1}^k}}{\overline{c_{j,t-1}^k}}$$

When the score is larger than a fraction of the standard deviation of the past data up to time t−1, user at time t is labeled as an anomaly, i.e., $$S_{j,t}^k > \theta \sigma_{j,t-1}^k$$

where θ is the fraction coefficient, and $\sigma_{j,t-1}^k$ the standard deviation expressed as:

$$\sigma_{j,t-1}^k = \sqrt{\frac{1}{t-1} \sum_{i=1}^{t-1} \left(C_{j,i} - \overline{C_{j,t-1}^k}\right)^2}$$

As new data points are obtained, $C_{j,t}^k$ and $\sigma_{j,t}^k$ are updated. In this process, the sliding window of length W may be used to limit the size of the training data. Thus, for example, assuming one-month of training data, the value of W is 672 when the analytic is based on hourly data, or 30 when the analytic is based on daily data. Applying an exponentially-weighted moving average, $C_{j,t}^k$ and $\sigma_{j,t}^k$ preferably are then updated online (i.e on the cloud), e.g., as follows:

$$\overline{C_{j,t}^k} = \alpha \overline{C_{j,t-1}^k}(1-\alpha)C_{j,t}$$

where is a weight factor.

In a representative time-series analysis, a use case (running locally) analyzes time-series data of low dimension, e.g., only one feature (or perhaps just a few features) in the training data. Using the cloud-based resources as described below, this time-series analysis can then be generalized to apply to high-dimensional features, even for such individual use case. In a representative operating scenario, the system applies dimension reduction techniques on such high-dimensional data, e.g., by applying Latent Dirichlet Allocation (LDA).

Global Detection (On the Cloud Application):

Machine learning algorithms that execute in the cloud include, for example, Latent Dirichlet allocation (LDA), Gaussian Mixture Model (GMM), and others. In an embodiment involving the above-described scenario (i.e., multiple low-dimensional use cases running locally), the application on the cloud is operative to capture a correlation among the different use cases. That multi-use case correlation is now described.

In particular, and as mentioned above, preferably a Mahalanobis distance (MD) function is used to capture a correlation among observed parameters in different use cases. MD, in contrast to Euclidean distance, distinguishes multivariate data groups and reveals variability impact of one parameter on other parameter when their scales are different.

To this end, let:

$$A_{j,t}^K(a_{j,t}^1 m\ a_{j,t}^2,\ a_{j,t}^{K-1},\ a_{j,t}^K)$$

denote candidate anomalies of user j at time t for all the K use cases. Let $A_j$ denote a T×K matrix containing anomaly data points for user over the last time slots for all the use cases.

For each new data point t, and for user the MD between different use cases in the sliding window is calculated as:

$$MD_{j,t} = \sqrt{(A_{j,t}^K - \mu_j)^T S_j^{-1}(A_{j,t}^K - \mu_j)}$$

where $\mu_j = (\mu_{j,1}, \mu_{j,2}, \ldots, \mu_{j,K})^T$ is the mean vector, and $\mu_{j,k}$ is the average of the measurement for user j in use case k, $S_j$ is the covariance matrix of these K use cases:

$$\mu_{j,k} = \frac{1}{T}\sum_{t=1}^T a_{j,t}^k$$

The element of kth row and k'th column of matrix $S_j$ is calculated as:

$$S_{j,k,k'} = \frac{1}{T-1}\sum_{t=1}^T (a_{j,t}^k - \mu_{j,k})(a_{j,t}^{k'} - \mu_{j,k'})$$

$MD_{j,t}$ measures how much the use case measures deviate from each other, which follows a chi-square distribution with K degree of freedom. In one embodiment, an alert is raised for user j at time t if:

$$MD_{j,t} > \sqrt{X_{K,0.98}^2}$$

As one of ordinary skill will appreciate, the above-described computation (which occurs on the cloud and by which the cloud tier learns correlation statistics for each user) is not feasible in the local environment, at least in part because it preferably uses all training data for preferably all use cases. As noted above, typically in the local environment a use case just uses its own set of training data. The cloud computation, however, is computationally- and storage-efficient given that the cloud resources are scalable. The MD metrics preferably are maintained and updated for each individual user upon every new data point representing an anomaly; thus, the resource requirements are not insignificant, especially with respect to a large enterprise with a large number of users.

The above-described ML algorithms or computations are not intended to be limited but, rather, are merely provided as an example scenario of how distributed learning is carried out using the framework. Other methods that can benefit from or otherwise leverage the distributed learning approach herein include, without limitation, Hyper-parameter optimization (such as a Support Vector Machine), Gradient computation (such as Stochastic Gradient Descent), Boosting algorithms (such as Gradient Boosting Machine), Random Forest, MapReduce (to handle distributed data sources), Expectation-maximization algorithms, Neural networks, and others.

The machine learning system herein provides significant advantages. It leverages a multi-tier distributed learning approach so that each tier of the learning appropriate leverages the available hardware and software resources that are available. The approach in particular enables correlation (e.g., by Mahalanobis distance) among multiple use cases of time-series analysis, thereby enabling the local system to have multiple use cases running simultaneously, each of which can use a different algorithm. The distributed machine learning enables robust detection of abnormalities exhibited in network activities or user behavior. The approach is fine-grained, efficient, and scalable. More generally, the technique herein provides for an enhanced network activity and user behavior analytics system that can detect insider threats, helping security analysts detect anomalous or malicious behaviors that occur on the network.

This subject matter may be implemented in whole or in part as-a-service. The machine learning (ML) functionality may be provided as a standalone function, or it may leverage functionality from other ML-based products and services.

In a typical use case, a SIEM or other security system has associated therewith a user interface that can be used to render the alert visually, to search and retrieve relevant information from alert database, and to perform other known input and output functions with respect thereto.

As noted above, the approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

The notion of a "tier" as used herein is not intended to be limiting, e.g., to require some rigid type of hierarchical relationship between or among the distributed ML functionality. A "tier" may also be envisioned as a "level" or, more generally, a component or part of a distributed ML-based functionality.

Having described the invention, what we claim is as follows:

1. A method for anomaly detection in association with an enterprise environment, comprising:
   providing first machine learning to train at least a first and a second analytic, the first analytic corresponding to a first use case, and the second analytic corresponding to a second use case distinct from the first use case;
   outputting to a second machine learning, and in a continuous manner, anomaly information derived from the first machine learning, the anomaly information including data points detected by the first machine learning as a result of applying the first and second analytics with respect to the first and second use cases; and
   providing the second machine learning based on the anomaly information to capture a correlation among observed parameters in at least the first and second use cases;
   wherein the first machine learning takes place in an enterprise network, and the second machine learning takes place in a cloud computing environment distinct from the enterprise network.

2. The method as described in claim 1 wherein each of the first and second use cases uses a distinct training data set.

3. The method as described in claim 1 wherein training data for at least one of the first and second use cases is time-series data.

4. The method as described in claim 1 further including outputting configuration and training data from the enterprise network to the cloud computing environment.

5. The method as described in claim 1 wherein the correlation is a multi-dimensional distance measure.

6. The method as described in claim 1 further including taking an action with respect to detected network activity or user behavior based the captured correlation provided by the second machine learning.

7. An apparatus, comprising:
   hardware processors;
   computer memory holding computer program instructions executed by the hardware processors for anomaly detection in association with an enterprise environment, the computer program instructions configured to:
   provide first machine learning to train at least a first and a second analytic, the first analytic corresponding to a first use case, and the second analytic corresponding to a second use case distinct from the first use case;
   output to a second machine learning, and in a continuous manner, anomaly information derived from the first machine learning, the anomaly information including data points detected by the first machine learning as a result of applying the first and second analytics with respect to the first and second use cases; and provide the second machine learning based on the anomaly information to capture a correlation among observed parameters in at least the first and second use cases;

wherein the first machine learning takes place in an enterprise network, and the second machine learning takes place in a cloud computing environment distinct from the enterprise network.

8. The apparatus as described in claim 7 wherein each of the first and second use cases uses a distinct training data set.

9. The apparatus as described in claim 7 wherein training data for at least one of the first and second use cases is time-series data.

10. The apparatus as described in claim 7 wherein the computer program instructions are further configured to output configuration and training data from the enterprise network to the cloud computing environment.

11. The apparatus as described in claim 7 wherein the computer program instructions are configured to execute a multi-dimensional distance measure to determine the correlation.

12. The apparatus as described in claim 7 wherein the computer program instructions are further configured to take an action with respect to detected network activity or user behavior based the captured correlation provided by the second machine learning.

13. A computer program product in a non-transitory computer readable medium for use in first and second data processing systems for anomaly detection in association with an enterprise environment, the computer program product holding computer program instructions that, when executed by a respective one of the first and second data processing systems, are configured to:

provide first machine learning to train at least a first and a second analytic, the first analytic corresponding to a first use case, and the second analytic corresponding to a second use case distinct from the first use case;

output to a second machine learning, and in a continuous manner, anomaly information derived from the first machine learning, the anomaly information including data points detected by the first machine learning as a result of applying the first and second analytics with respect to the first and second use cases; and provide the second machine learning based on the anomaly information to capture a correlation among observed parameters in at least the first and second use cases;

wherein the first machine learning takes place in the first data processing system within an enterprise network, and the second machine learning takes place in the second data processing system located in a cloud computing environment distinct from the enterprise network.

14. The computer program product as described in claim 13 wherein each of the first and second use cases uses a distinct training data set.

15. The computer program product as described in claim 13 wherein training data for at least one of the first and second use cases is time-series data.

16. The computer program product as described in claim 13 wherein the computer program instructions are further configured to output configuration and training data from the first data processing system to the second data processing system.

17. The computer program product as described in claim 13 wherein the computer program instructions are configured to execute a multi-dimensional distance measure to determine the correlation.

18. The computer program product as described in claim 13 wherein the computer program instructions are further configured to take an action with respect to detected network activity or user behavior based the captured correlation provided by the second machine learning.

19. A machine learning system for anomaly detection, comprising:

a memory;

a first machine learning system executing in a first operating environment, the first machine learning system training at least a first and a second analytic, the first analytic corresponding to a first use case, and the second analytic corresponding to a second use case distinct from the first use case, the first machine learning system training on the first and second use cases simultaneously; and a second machine learning system executing in a second operating environment remote from the first machine learning system, the second machine learning system configured to capture a multi-dimensional distance measure correlation among observed parameters in at least the first and second use cases, the observed parameters being derived by the first machine learning system;

wherein the observed parameters are output from the first machine learning system to the second machine learning system in a continuous manner.

20. The machine learning system as described in claim 19 wherein the first machine learning system executes as an application in a Security Event and Incident Management Platform (SIEM), and wherein the second machine learning system executes as an application in a cloud compute infrastructure with the second operating environment.

* * * * *